United States Patent
Namiki

(10) Patent No.: US 7,777,723 B2
(45) Date of Patent: Aug. 17, 2010

(54) MOUSE

(76) Inventor: Tosiki Namiki, 120-1 Nozawa, Saku-shi, Nagano 385-0053 (JP)

(*) Notice: Subject to any disclaimer, the term of this patent is extended or adjusted under 35 U.S.C. 154(b) by 677 days.

(21) Appl. No.: 11/545,927

(22) Filed: Oct. 11, 2006

(65) Prior Publication Data

US 2008/0001920 A1  Jan. 3, 2008

(30) Foreign Application Priority Data

Jun. 28, 2006 (JP) .............................. 2006-005137

(51) Int. Cl.
*G09G 5/08* (2006.01)

(52) U.S. Cl. ..................... 345/163; 345/164; 345/165; 345/166; 345/157; 345/159; 248/118; D14/402; D14/405; D14/406; D14/407; D14/408; D14/409; D14/410; 463/37; 463/38

(58) Field of Classification Search ......... 345/156–158, 345/163–164; 248/118, 118.5, 118.1; D14/402, D14/405, 406–410; 463/37–38

See application file for complete search history.

(56) References Cited

U.S. PATENT DOCUMENTS

| 4,582,498 | A | 4/1986 | Tamada |
| 4,928,412 | A | 5/1990 | Nishiyama |
| 5,156,283 | A | 10/1992 | Sampson |
| 5,175,534 | A * | 12/1992 | Thatcher ..................... 345/156 |
| 5,256,457 | A | 10/1993 | Pantaleo et al. |
| 5,269,717 | A | 12/1993 | Tardif |
| 5,355,147 | A * | 10/1994 | Lear ........................... 345/156 |
| 5,553,735 | A | 9/1996 | Kimura |
| 5,570,112 | A | 10/1996 | Robinson |
| D381,015 | S | 7/1997 | Morrison et al. |
| 5,851,623 | A | 12/1998 | Tarulli et al. |
| 5,948,520 | A | 9/1999 | Hirsch |
| 6,016,138 | A | 1/2000 | Harskamp et al. |
| D420,339 | S | 2/2000 | Burke |
| 6,040,539 | A | 3/2000 | Hiegel |
| 6,066,021 | A | 5/2000 | Lee |
| 6,099,929 | A | 8/2000 | Chinen |
| 6,099,934 | A | 8/2000 | Held |
| 6,106,909 | A | 8/2000 | Hirsch |
| 6,117,502 | A | 9/2000 | Liao |
| 6,138,870 | A | 10/2000 | Lin |
| 6,155,411 | A | 12/2000 | Ho |
| 6,160,540 | A | 12/2000 | Fishkin et al. |
| 6,195,085 | B1 | 2/2001 | Becker et al. |
| 6,377,244 | B1 * | 4/2002 | Reid et al. .................. 345/163 |
| 6,380,926 | B1 | 4/2002 | Ho |
| 6,525,713 | B1 * | 2/2003 | Soeta et al. ................. 345/160 |
| 2002/0154095 | A1 * | 10/2002 | Whitcomb .................. 345/163 |

FOREIGN PATENT DOCUMENTS

EP         0899650       3/1999

* cited by examiner

*Primary Examiner*—Lun-Yi Lao
*Assistant Examiner*—Olga Merkoulova
(74) *Attorney, Agent, or Firm*—Bacon & Thomas, PLLC

(57) ABSTRACT

A mouse is provided with function buttons being aligned back and forth on its surface. Thus, the width is narrower than in a general mouse to make the mouse slim. Furthermore, the back-and-forth function buttons can be pressed by a finger tip put on the upper surface of the mouse to operate the mouse.

2 Claims, 3 Drawing Sheets

F I G. 1
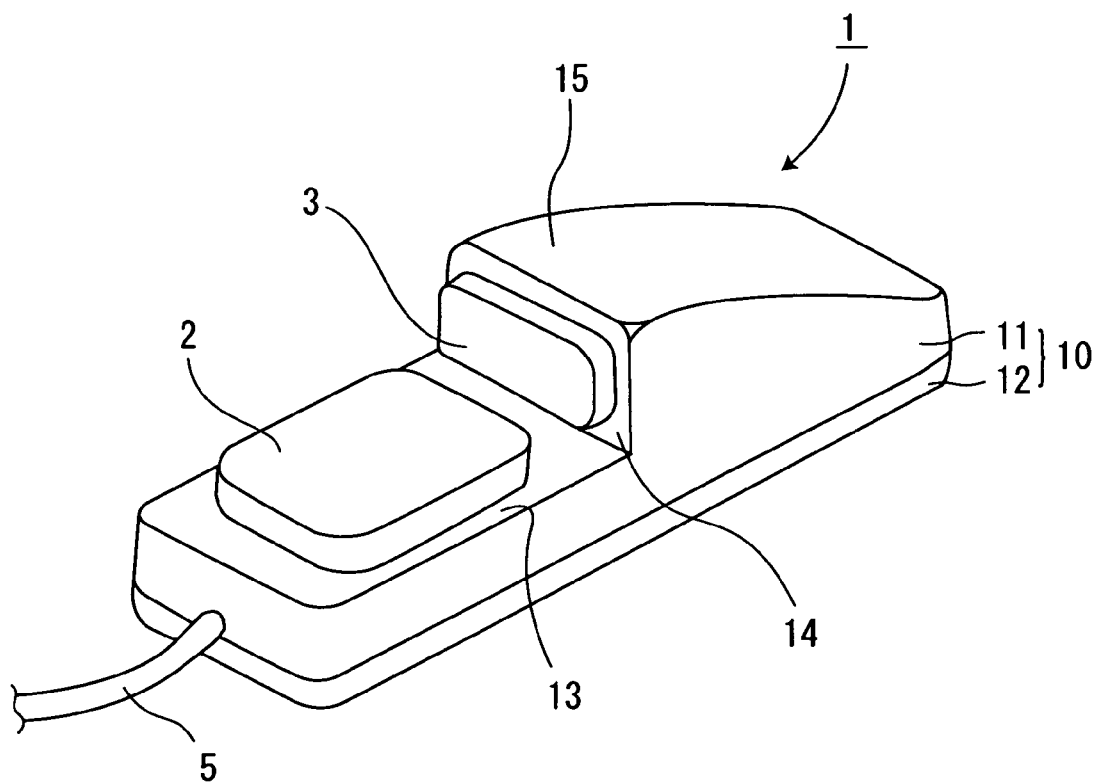

F I G. 2
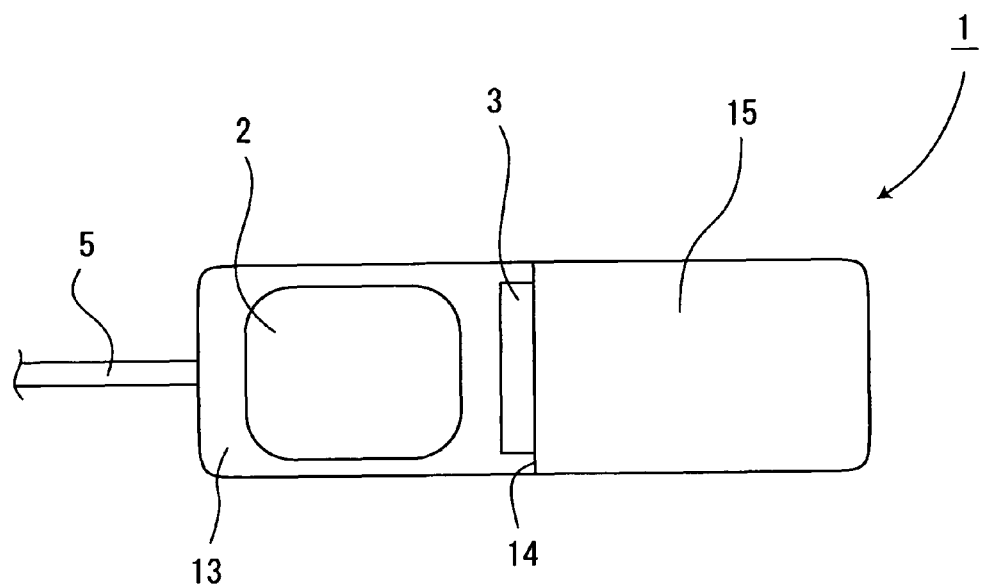
F I G. 3
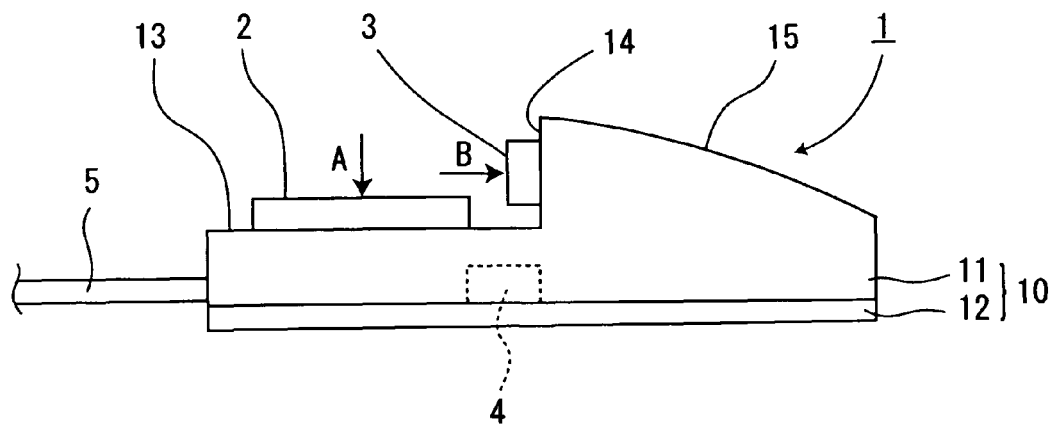

F I G. 4
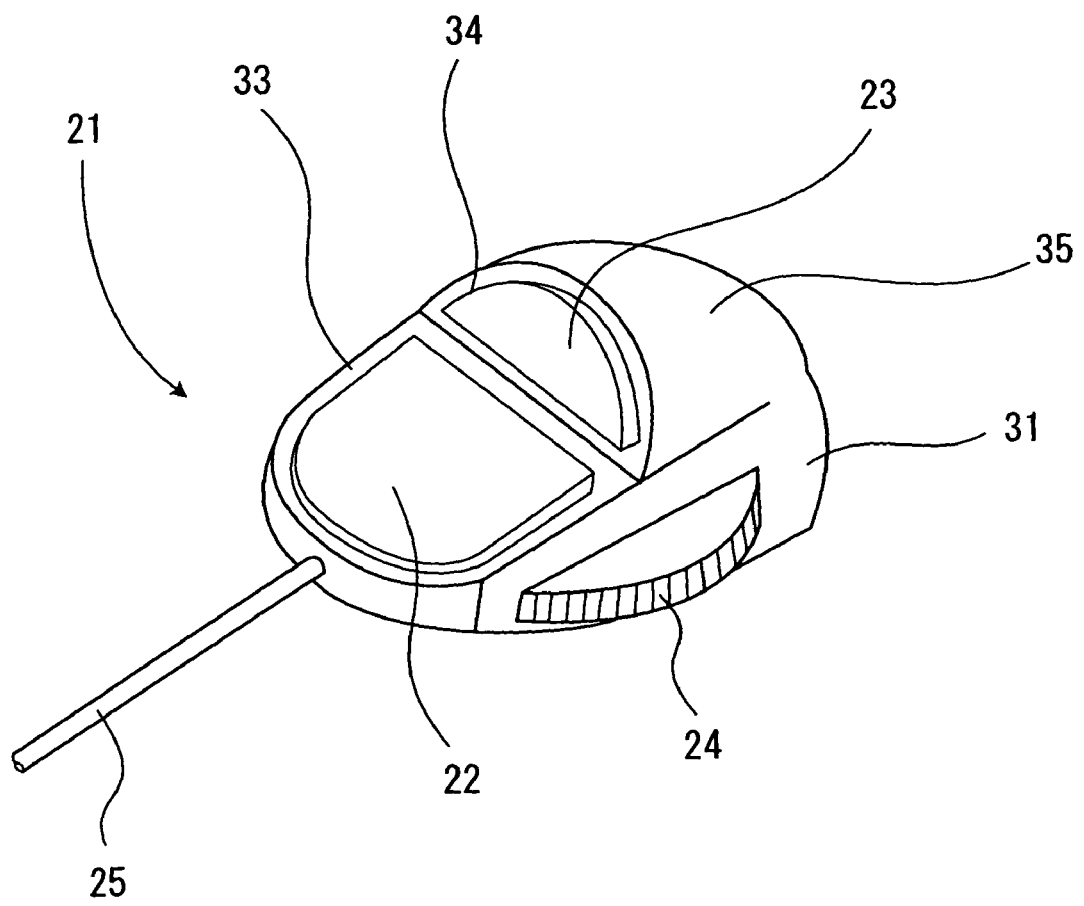

MOUSE

REFERENCE TO RELATED APPLICATIONS

Reference is made to U.S. patent application Ser. No. 11/546,756 to be filed Oct. 12, 2006 and entitled "Personal Computer Mouse", which claims priority from Japanese Patent Application No. 2006-003946 filed May 24, 2006.

Each of the above referenced applications, and each document cited in this text ("application cited documents") and each document cited or referenced in each of the application cited documents, and any manufacturer's specifications or instructions for any products mentioned in this text and in any document incorporated into this text, are hereby incorporated herein by reference; and, technology in each of the documents incorporated herein by reference can be used in the practice of this invention.

It is noted that in this disclosure, terms such as "comprises", "comprised", "comprising", "contains", "containing" and the like can have the meaning attributed to them in U.S. Patent law; e.g., they can mean "includes", "included", "including" and the like. Terms such as "consisting essentially of" and "consists essentially of" have the meaning attributed to them in U.S. Patent law, e.g., they allow for the inclusion of additional ingredients or steps that do not detract from the novel or basic characteristics of the invention, i.e., they exclude additional unrecited ingredients or steps that detract from novel or basic characteristics of the invention, and they exclude ingredients or steps of the prior art, such as documents in the art that are cited herein or are incorporated by reference herein, especially as it is a goal of this document to define embodiments that are patentable, e.g., novel, non-obvious, inventive, over the prior art, e.g., over documents cited herein or incorporated by reference herein. And, the terms "consists of" and "consisting of" have the meaning ascribed to them in U.S. Patent law; namely, that these terms are closed ended.

BACKGROUND OF THE INVENTION

1. Field of the Invention

The present invention relates to a mouse as an input device for a personal computer.

2. Description of the Related Art

A mouse is used as an input device of a personal computer, and the mouse having left and right function buttons which can perform an operation of selection, execution, etc., of files in the personal computer, a detection portion for detecting the direction and distance of movement of the mouse, and a connection portion for connection to the personal computer is known.

When the mouse is horizontally moved on a flat surface such as a desk top, etc., the direction and distance of the movement are detected by the detection portion. Then, the direction and distance of the movement detected by the detection portion are converted to a signal and outputted when the function button is pressed, and the signal is transmitted to the personal computer through the connection portion. Thus, the personal computer can be operated (see Japanese Unexamined Patent Application Publication No. 11-45154, for example).

Since the conventional mouse described above is provided with the function buttons which are laterally aligned on the upper surface of the mouse, the mouse itself must be large in width. Furthermore, it is required to operate the left and right function buttons by using different fingers, that is, it is required to operate the function buttons using two fingers.

SUMMARY OF THE INVENTION

In order to solve the above-described problems, it is an object of the present invention to provide a mouse in which the width can be narrowed to make it slim and a press operation of two function buttons can be performed using one finger.

In order to solve the above-described problems, a mouse of an aspect of the present invention is a mouse for use with a personal computer comprising a horizontal portion; a vertical portion; and a finger rest portion for having a finger placed thereon. In the mouse, the horizontal portion, the vertical portion, and the finger rest portion are provided on the upper portion of the mouse main body; two function buttons are provided, one on the horizontal portion and the other on the vertical portion, such that both function buttons are aligned in the forward and backward direction; and it is made possible to press each of both function buttons by using the finger placed on or covering the upper portion of the finger rest portion.

Then, a function button capable of being pressed downward is provided on the horizontal portion and a function button capable of being pressed backward is provided on the vertical portion.

A mouse of another aspect of the present invention is a mouse for use with a personal computer comprising a horizontal portion; a vertical portion; and a finger rest portion for having a finger placed thereon. In the mouse, the horizontal portion, the vertical portion, and the finger rest portion are provided on the upper portion of the mouse main body; two function buttons are provided, one on the horizontal portion and the other on the vertical portion, such that both function buttons are aligned in the forward and backward direction; it is made possible to press each of both function buttons by using the finger placed on or covering the upper portion of the finger rest portion; a rotatable scroll plate is provided in the mouse main body; and the scroll plate can perform a common scroll function and a high-speed scroll function in accordance with the operation of the scroll plate.

Then, a function button capable of being pressed downward is provided on the horizontal portion and a function button capable of being pressed backward is provided on the vertical portion.

The mouse according to an aspect of the present invention is provided with two function buttons aligned back and forth on its upper surface. Thus, the mouse can be made smaller in width than a mouse having two function buttons laterally aligned, and the shape of the mouse can be made slim. Then, in the present invention, one finger is placed on the upper surface of the mouse, each of the function buttons aligned back and forth is pressed by one finger placed thereon, or the function buttons aligned back and forth can be pressed by one finger out of fingers covering the upper surface of the mouse.

The mouse according to another aspect of the present invention is provided with two function buttons aligned back and forth on its upper surface and provided with a rotatable scroll plate in the main body of the mouse. Thus, the mouse can be made smaller in width than a mouse having two function buttons laterally aligned, and a scroll function can be performed. Furthermore, the scroll function can be realized such that the scroll is performed at a normal speed or at a high speed.

Then, in the present invention, one finger is placed on the upper surface of the mouse, each of the function buttons aligned back and forth is pressed by one finger placed thereon, or the function buttons aligned back and forth can be pressed by one finger out of fingers covering the upper surface of the mouse.

BRIEF DESCRIPTION OF THE DRAWINGS

FIG. 1 is a schematic perspective view showing a mouse according to an embodiment of the present invention;

FIG. 2 is a schematic top view of the mouse shown in FIG. 1;

FIG. 3 is a schematic side view of the mouse shown in FIG. 1; and

FIG. 4 is a schematic perspective view showing a mouse according to another embodiment of the present invention.

DESCRIPTION OF THE PREFERRED EMBODIMENTS

Hereinafter, the embodiments of the present invention shown in the drawings are described. In FIGS. 1 to 3, a mouse according to a first embodiment of the present invention is shown. FIG. 1 is a perspective view, FIG. 2 is a top view, and FIG. 3 is a side view of the mouse.

As shown in FIGS. 1 to 3, a mouse 1 is provided with function buttons 2 and 3 on its upper surface, a case 10 having a detection portion 4 capable of detecting the direction and distance of the movement when the mouse 1 is moved, and a connection portion 5 which is connected to a personal computer (not illustrated) and can transmit signals.

The case 10 is provided with a horizontal portion 13, a vertical portion 14, and a finger rest portion 15 on its upper surface, and is composed of a main body 11 in which the lower surface is made open and a lower cover 12 which is provided on the lower surface of the main body 11 so as to cover the opening portion.

The horizontal portion 13 of the main body 11 is provided with the function button 2, and the vertical portion 14 is provided with the function button 3. The finger rest portion 15 is provided on the upper surface of the main body 11 from the vertical portion 14 to the rear portion of the main body 11, and, when the mouse 1 is used, the inner surface of an index finger is put on the finger rest portion 15 and the finger rest portion 15 can be covered by a plurality of fingers, for example.

The function button 2 is capable of being pressed downward (in the direction of A in FIG. 3), and the function button 3 is capable of being pressed backward (in the direction of B in FIG. 3). These function buttons 2 and 3 have the same function as the function buttons provided in the conventional mouse. Moreover, the function buttons 2 and 3 are made to return their initial position when the pressure is released.

The detection portion 4 is provided inside the case 10, and, when the mouse 1 is moved, the detection portion 4 has the function for detecting the direction and distance of movement of the mouse 1. The detection portion 4 is of a ball type using a mouse ball, of an optical type using an optical sensor, etc.

The connection portion 5 is enough to transmit signals generated in the operation of the mouse 1 to the personal computer, and one of a wired type or of a wireless type can be used.

Since the mouse 1 has the above-described structure, when the function buttons 2 and 3 are pressed, signals are transmitted to the personal computer through the connection portion 5 and an operation in accordance with each function button can be performed on the personal computer.

Furthermore, when the mouse 1 is moved back and forth and from side to side, the detection and distance of the movement are detected by the detection portion 4, the detected signal is transmitted to the personal computer through the connection portion 5, and a cursor can be moved on the screen of the personal computer.

Since the mouse 1 according to the present invention is small in size and narrow in width, the loss of the mouse can be prevented by making it possible to put the mouse 1 in the main body of the personal computer, for example.

In the mouse 1 of the present embodiment constituted as described above, since the function buttons 2 and 3 are provided on the upper surface of the main body 11 so as to be aligned back and forth, the mouse 1 can be made about as narrow as the width of one finger.

Moreover, in the state that the inner surface of a finger is put on or covers the finger rest portion 15, both function buttons 2 and 3 can be operated by one finger.

FIG. 4 shows another embodiment of the present invention, and, also in this mouse 21, a horizontal portion 33 and a vertical portion 34 are provided on the upper surface of a main body 31, a function button 22 is provided in the horizontal portion 33, and a function button 23 is provided in the vertical portion 34. Thus, the function buttons 22 and 23 are arranged in the back-and-forth direction.

The finger rest portion 35 is provided on the upper surface of the main body 31 from the vertical portion 34 to the rear portion of the main body 31 and, when the mouse 21 is used, the inner surface of an index finger can be put on the finger rest portion 35. Or the finger rest portion 35 of the mouse 21 can be covered by other fingers than a thumb.

The function button 22 is capable of being pressed downward, and the function button 23 is capable of being pressed backward. These function buttons 22 and 23 have the same function as the function buttons of a general mouse. Moreover, the function buttons 22 and 23 are made to return to their initial positions when the pressure is released.

A scroll plate 24 which can be horizontally rotated is provided on the side of the main body 31.

A detection portion (not illustrated) is provided inside the case 10, and, when the mouse 21 is moved, the detection portion has the function for detecting the direction and distance of movement of the mouse 21. The detection portion is of a ball type using a mouse ball, of an optical type using an optical sensor, etc.

The connection portion 25 is enough to transmit signals generated in the operation of the mouse 21 to the personal computer, and one of a wired type or of a wireless type can be used.

Since the mouse 21 has the above-described structure, when the function buttons 22 and 23 are pressed, signals are transmitted to the personal computer through the connection portion 25 and an operation in accordance with each function button can be performed on the personal computer.

Furthermore, when the mouse 21 is moved back and force and from side to side, the direction and distance of the movement are detected by the detection portion, the detected signal is transmitted to the personal computer through the connection portion 25, and a cursor can be moved on the screen of the personal computer.

Moreover, when the scroll plate 24 is rotated by a thumb, for example, the screen of the personal computer can be quickly moved upward or downward.

Since the mouse 21 according to the present invention is small in size and narrow in width, the loss of the mouse can be prevented by making it possible to put the mouse into the main body of the personal computer, for example.

In the mouse 21 of the present embodiment constituted as described above, since the function buttons 22 and 23 are provided on the upper surface of the main body 31 so as to be aligned back and forth, the mouse 21 can be made about as narrow as the width of one finger and, in addition, the scroll function can be performed.

Moreover, although the scroll plate 24 is provided on the left side of the main body 31 so as to be operated by a thumb, it may be constituted such that the scroll plate 24 is provided on the right side of the main body 31 so as to be operated by another finger.

What is claimed is:

1. A mouse for use with a personal computer comprising:
a mouse main body, the mouse main body including a horizontal portion, a vertical portion, and a finger rest portion for accommodating a finger placed thereon, the horizontal portion being vertically lower than the finger rest portion,
wherein the horizontal portion includes a first surface extending horizontally on the mouse main body, and the vertical portion includes a second surface extending vertically on the mouse main body such that the first surface and the second surface intersect in a substantially perpendicular manner,
wherein the horizontal portion, the vertical portion, and the finger rest portion are provided on an upper portion of the mouse main body,
wherein a first function button is disposed on the first surface of the horizontal portion and a second function button is disposed on the second surface of the vertical portion, the first and second function buttons being aligned in a forward/backward direction of the mouse main body such that both the first and second function buttons are actuated by a same single finger, the first function button being arranged to be pressed in a downward direction, the second function button being arranged to be pressed in a backward direction, and
wherein the first and second function buttons are arranged to be pressed by the finger placed on the finger rest portion.

2. A mouse for use with a personal computer comprising:
a mouse main body, the mouse main body including a horizontal portion, a vertical portion, and a finger rest portion for accommodating a finger placed thereon, the horizontal portion being vertically lower than the finger rest portion,
wherein the horizontal portion includes a first surface extending horizontally on the mouse main body, and the vertical portion includes a second surface extending vertically on the mouse main body such that the first surface and the second surface intersect in a substantially perpendicular manner,
wherein the horizontal portion, the vertical portion, and the finger rest portion are provided on an upper portion of the mouse main body,
wherein a first function button is disposed on the first surface of the horizontal portion and a second function button is disposed on the second surface of the vertical portion, the first and second function buttons being aligned in a forward/backward direction of the mouse main body such that both the first and second function buttons are actuated by a same single finger, the first function button being arranged to be pressed in a downward direction, the second function button being arranged to be pressed in a backward direction,
wherein the first and second function buttons are arranged to be pressed by the finger placed on the finger rest portion,
wherein a rotatable scroll plate is provided on the mouse main body, and
wherein the scroll plate can perform a common scroll function and a high-speed scroll function in accordance with the operation of the scroll plate.

* * * * *